(12) United States Patent
Jiang et al.

(10) Patent No.: US 8,731,855 B2
(45) Date of Patent: May 20, 2014

(54) METHOD AND DEVICE FOR MONITORING THE NOISE FROM A SENSOR

(75) Inventors: Zheng-Yu Jiang, Regensburg (DE); Matthias Kretschmann, Regensburg (DE); Herbert Preis, Bach a.d. Donau (DE)

(73) Assignee: Continental Automotive GmbH, Hannover (DE)

( * ) Notice: Subject to any disclaimer, the term of this patent is extended or adjusted under 35 U.S.C. 154(b) by 1229 days.

(21) Appl. No.: 12/440,026

(22) PCT Filed: May 29, 2007

(86) PCT No.: PCT/EP2007/055150
§ 371 (c)(1),
(2), (4) Date: Aug. 11, 2010

(87) PCT Pub. No.: WO2008/028697
PCT Pub. Date: Mar. 13, 2008

(65) Prior Publication Data
US 2010/0299083 A1    Nov. 25, 2010

(30) Foreign Application Priority Data

Sep. 6, 2006  (DE) .......................... 10 2006 041 867

(51) Int. Cl.
*G01R 29/26* (2006.01)
(52) U.S. Cl.
USPC .......................................................... 702/69

(58) Field of Classification Search
USPC .............. 702/69, 90, 146, 179, 188, 191, 199
See application file for complete search history.

(56) References Cited

U.S. PATENT DOCUMENTS

| | | | | |
|---|---|---|---|---|
| 5,386,372 A | * | 1/1995 | Kobayashi et al. | 700/280 |
| 5,764,537 A | | 6/1998 | Walter et al. | 364/554 |
| 6,601,005 B1 | | 7/2003 | Eryurek | |
| 6,741,919 B1 | | 5/2004 | Schuster et al. | 701/34 |
| 2005/0085987 A1 | * | 4/2005 | Yokota et al. | 701/80 |
| 2008/0206052 A1 | * | 8/2008 | Volkmer | 416/61 |

FOREIGN PATENT DOCUMENTS

| | | | |
|---|---|---|---|
| DE | 3148735 C2 | 3/1992 | |
| DE | 19733920 A1 | 2/1999 | |
| DE | 19839047 A1 | 1/2000 | |
| DE | 10318602 A1 | 11/2004 | |
| EP | 1277623 B1 | 8/2006 | |
| JP | H09505420 A | 5/1997 | ............. G01D 21/00 |
| JP | 2004257368 A | 9/2004 | ............. F01D 25/00 |

\* cited by examiner

*Primary Examiner* — Mohamed Charioui
(74) *Attorney, Agent, or Firm* — King & Spalding L.L.P.

(57) ABSTRACT

A method and device for monitoring the noise from a sensor and a use of the method in automobiles for determining a frictional value between tires of a motor vehicle and a road surface, in particular an economical and reliable method for monitoring a sensor noise and a corresponding device for obtaining, amongst other things, system-relevant information may be achieved, wherein an influence on spectral components of the sensor noise signal is determined and compared with set values.

15 Claims, 4 Drawing Sheets

METHOD AND DEVICE FOR MONITORING THE NOISE FROM A SENSOR

CROSS-REFERENCE TO RELATED APPLICATIONS

This application is a U.S. National Stage Application of International Application No. PCT/EP2007/055150 filed May 29, 2007, which designates the United States of America, and claims priority to German Patent Application No. 10 2006 041 867.0 filed Sep. 6, 2006. The contents of these applications are incorporated herein in their entirety by this reference.

TECHNICAL FIELD

The present invention relates to a method and a device for monitoring the noise of a sensor, and also use of a method in accordance with the invention, in vehicles, for determining the friction occurring between two tires of a motor vehicle and a road surface.

BACKGROUND

It is known, from the prior art, that a signal/noise ratio (SNR) in a measuring system is set so that the electrical power requirement is low. The SNR is here however dependent on several parameters, e.g. temperature, voltage, etc. This is disclosed in DE 103 18 602 A1 for example. Further methods, all aimed at processing a signal in a way that causes little interference, are also known. Noise is furthermore regarded, within the prior art, as being a fault parameter with stochastic properties, lowering electrical efficiency and having a negative effect on measurements.

SUMMARY

According to various embodiments, an economical and reliable method of monitoring sensor noise, and a corresponding device can be created, in order, among other things, to obtain information concerning a given system.

According to an embodiment, a method of monitoring sensor noise, an effect of spectral components of the sensor noise signal is determined and compared with reference values.

According to a further embodiment, the analysis may occur on the basis of the standard deviation of the arithmetic mean. According to a further embodiment, an output signal of a sensor may be sampled and sample values can be combined in groups of a number of sample values and are subject to first averaging, and the results of this first averaging can be subject to a second form of averaging, taking one or more adjacent or preceding and/or subsequent values into account. According to a further embodiment, the arithmetic technique for calculating and evaluating sensor noise may use a convolutional technique. According to a further embodiment, the convolutional technique can be used with different granularities. According to a further embodiment, frequencies above the normal driving dynamics, particularly frequencies over approx. 5 Hz, can be included in the evaluation.

According to another embodiments, a device for monitoring the noise of a sensor may comprise a means of implementing a method, whereby a sampler is connected to a signal output of a sensor, and the sampler is connected to a first buffer memory for the storage of sample values, and the buffer memory is connected to an arithmetic element for determining a first average, whereby the arithmetic element can be adjusted with regard to the number of sample values or window width to be processed, and a second memory is connected to an output of the arithmetic element for storage of results in the sequence in which they arrive, and the second memory is connected to a second arithmetic element, so that a second form of averaging can be carried out, taking one or more adjacent or preceding and/or subsequent values into account.

According to a further embodiment of the device, the device may include a convolutional arithmetic element with an input for the setting of different levels of granularity. According to a further embodiment of the device, an output, for transmitting a resulting value and/or a comparative assessment of results, can be connected to comparison means and to a data ROM containing a reference value.

According to yet another embodiment, using a method as described above, the presence of a current friction value of a road surface can be concluded from an output signal, through comparison with set threshold values.

BRIEF DESCRIPTION OF THE DRAWINGS

Further features and advantages of the invention are stated below in connection with description of an exemplary embodiment, and with reference to the Figures of the drawing, in which.

The same reference numerals and characters are used for the same functions, component parts and process stages, across the different exemplary embodiments and diagrams.

DETAILED DESCRIPTION

Figure 1:
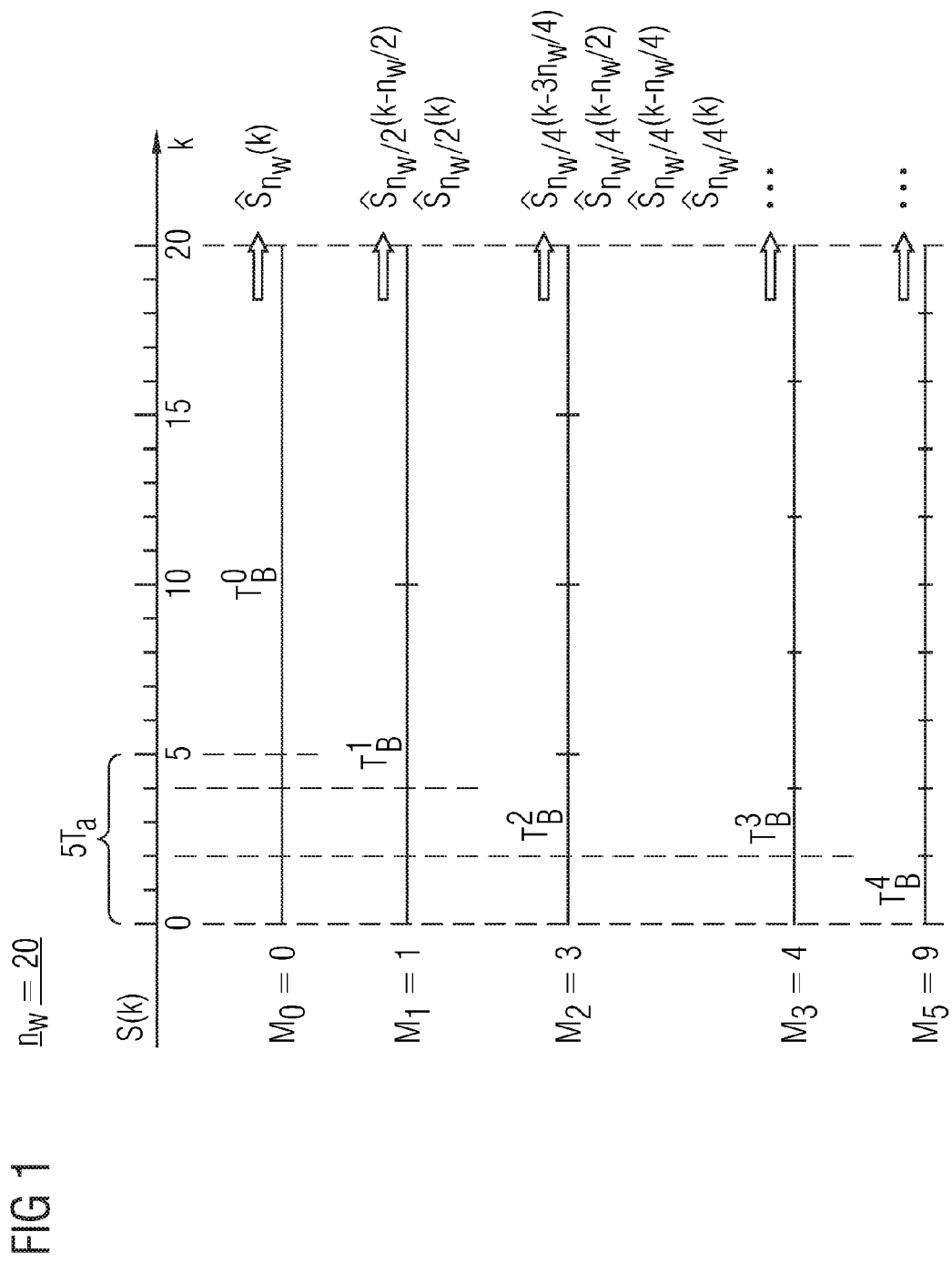
FIG. 1: shows a diagram illustrating the process of a noise-monitoring method when several output values of differing indicative content are output, with a change in granularity.

A substantial part of various embodiments is a move away from seeing noise as purely a fault parameter. Noise is used instead, within the framework of various embodiments, as a source of information to be used. The method for monitoring the noise of a sensor output signal is characterized in accordance with various embodiments in that the influence of spectral components of the sensor noise signal is determined and compared with set values. This analysis is preferably carried out on the basis of the standard deviation of the arithmetic mean.

An embodiment is characterized in that an output signal of a sensor is sampled, grouped together into a given number of sample values and a first form of averaging is carried out, and in that the results of this first averaging undergo a second form of averaging, taking one or more adjacent or preceding and/or subsequent values into account.

A device in accordance with various embodiments provides means of implementing a method, whereby a sampler is connected to a signal output of a sensor, the sampler is connected to a first buffer memory for the storage of sample values in the sequence in which they arrive, and the buffer memory is connected to an arithmetic element for determining a first average, whereby the arithmetic element can be adjusted with regard to the number of sample values, and whereby a second memory is connected to an output of the arithmetic element for storage of results in the sequence in which they arrive, and the second memory is connected to a second arithmetic element, so that a second form of averaging can be carried out taking one or more adjacent or preceding and/or subsequent values into account, whereby the second arithmetic element is connected to an output on a data ROM and comparison means for transmitting a resulting value and/ or a comparing result evaluation.

A particularly advantageous use of a method according to various embodiments is based on the realization that a noisy sensor signal is not only caused by the quality of the sensor. A signal-quality similar to the noise can, for example, be caused by the normal driving dynamics of a motor vehicle, or by a specific roughness of the given road surface, or again by certain abnormal driving situations. The given effects can be distinguished in the frequency range, such that the effect of normal driving dynamics and of normal sensor functioning on a noise signal can be blocked out, through the form and mode of adjustment of signal analysis in accordance with various embodiments, in favor of the analysis of abnormal effects. In this way, in connection with the method in accordance with various embodiments, by adaptation to the very substantial motor vehicle sector, conclusions can be drawn, on a given road surface, from a sensor signal. In known techniques, ABS sensor output signals, for example, undergo more expensive secondary analysis in order to determine a given friction value. By contrast, the method according to various embodiments offers an economical, fast and reliable method of determining a rough estimate of friction between vehicle tires and road surface, and a corresponding device.

This representation of an application of a method according to various embodiments and a device developed accordingly does not represent a limitation on its use and/or adaptability. Rather, this application serves as an exemplary representation of a form of implementation of various embodiments, in terms of a detailed description of qualities and advantages, together with adaptation parameters.

Various embodiments offers an arithmetic technique for fast and efficient calculation of sensor noise and analysis by using the convolutional method.

In a vehicle, noise monitoring can be applied inter alia to the measured values, from analog sensor output signals, of a yaw rate $\omega_z$, a longitudinal acceleration $a_x$, a transverse acceleration $a_y$, individual wheel speeds $v_1$, $v_2$, $v_3$, $v_4$ or further driving dynamics sensors $d_i$ of the relevant vehicle with road contact that is as direct as possible. The process concerned is fundamentally the same for all these signals, occurring as follows:

Analog input magnitudes of a measured value are converted into series of discrete measuring points S(i) at sampling time-points i along the time axis, by sampling at fixed temporal intervals $T_a$ or at a sampling frequency $f_a$. Such a series of discrete measuring points or sample values S(i) is then divided up into analysis sections of a given number $n_w$ of sample values, and an average value is determined, whereby this analysis section is consequently the same as a window with a set width $n_w$, in M stages of the window width $n_w$ for example.

In other words, an analysis-section, of a temporal width that can be discretely set, is first created in the form of a sliding window in which all values are added and then divided by the given number of added values, to find the arithmetic mean or empirical average value. The average value over n time-intervals at time k is given by:

$$\bar{S}_n(k) = \frac{1}{n} \sum_{i=k\cdot n-1}^{k} S(i)$$

where:
n=the number of values S(i) per window or window-size k=0, 1, 2, etc., the running index over a total number of temporally discrete measuring points S(k) of the sampled analog sensor signals, which are divided up into a given number of sampled measured values.

The quadratic mean, or standard, deviation, otherwise known as the root mean square (RMS), over n time intervals at time k is then given by:

$$\hat{S}_n(k) = \sqrt{\frac{1}{(n-1)} \left( \sum_{i=k-n+1}^{k} [S(i) - \bar{S}_n(k)]^2 \right)}$$

A convolution over a set of different granularities M={$M_0$, $M_1$, $M_2$, ...} for a window width $n_w$ is given by:

$$S_{n_w}^{conv}(k) = F(n_w, M, S)$$

where F is a function that calculates and links the different RMS $\hat{S}_n(k)$ within the signals $S(k-n_w+1)$ and $S(k)$. The contributing frequencies can be selected through the choice of $n_w$ and of the given granularities M. In the present case, in accordance with FIG. 1, a linear addition is chosen with the equation:

$$S_{n_w}^{conv}(k) = \frac{1}{N} \sum_{i=1}^{N} \hat{S}_n(k)$$

Other forms of averaging, weighting or selective emphasis of certain frequencies not presented further below are also possible.

Within the above formulae, a window width or size $n_w$ specifies a focus on a given contribution of a certain frequency $f_b$, to be analyzed, to an end result. There is a limit to a lowest frequency $f_b$ affecting analysis and/or calculation by its period $T_b$ in accordance with the Nyquist-Shannon sampling theorem. The lowest frequency is calculated as being:

$$F_b \geq 1/(2*n_w*T_a)$$

This is the minimum frequency that can be set by means of a window of width $n_w$ by means of discrete measuring points S(i) of the analog input signal. This also shows the relationship whereby the analysis frequency $f_b$ also increases with increasing granularity M, that is, with increasing fragmentation of the window of width $n_w$. An analog signal can thereby be analyzed within the framework of the method described above, by selectively processing temporally discrete signals for the contribution of certain analyzed frequencies to significant departures from normal values for example towards the given analyzed frequencies.

In place of the formula proposed above a light and comparatively more effective, recursive formula, for the arithmetic mean, that is programmed on a microcontroller, is used below:

$$\bar{\eta}_w(k) = \bar{\eta}_w(k-1) + \frac{1}{n_w}\zeta(k),$$

where:

$$\zeta(k) = \eta(k) - \eta(k - n_w),$$

$$*(\overline{S}_n(k))$$

with the window-size $n_w$ and the parameter $\eta$ as one of the measured and sampled signal values $S(i)$, $i=1, 2, \ldots N$.

N is the total number of the measured values available. In accordance with this formula a window is slid over a sequence of sampling values such that, in each stage, a first value drops out of the window and a new, final value is taken up. An analogous procedure also lends itself to determining the RMS standard deviation.

FIG. 1 shows an exemplary embodiment concerning a number $n_w$ of 20 values, of the sampling sequence $S(k)$, obtained from an analog sensor output signal at a time interval $T_a = 4$ ms. These values are now stored in a corresponding device 1 in a memory 2 and processed by an arithmetic element, such that, dependent on granularity M applied each time on the same data series of $n_w=20$, the following results are determined for N=5, in the course of concluding linear averaging.

$$S_{20}^{conv}(k) = \frac{1}{5}\sum_{i=1}^{5}\hat{S}^i(k)$$

with the following individual values:

$$\hat{S}^1(k) = \hat{S}_{n_w}(k)$$

$$\hat{S}^2(k) = \frac{1}{2}\left(\hat{S}_{10}(k-10) + \hat{S}_{10}(k)\right)$$

$$\hat{S}^3(k) = \frac{1}{4}\left(\hat{S}_5(k-15) + \hat{S}_5(k-10) + \hat{S}_5(k-5) + \hat{S}_5(k)\right)$$

$$\hat{S}^4(k) = \frac{1}{5}\left(\hat{S}_4(k-16) + \hat{S}_4(k-12) + \hat{S}_4(k-8) + \hat{S}_4(k-4) + \hat{S}_4(k)\right)$$

$$\hat{S}^5(k) = \frac{1}{10}\sum_{i=0}^{9}\hat{S}_2(k-2i)$$

In the above results, the contributions of the following five frequencies are selected and taken into account:

$$f^1 \sim \frac{1}{T_B^0}$$

$$f^2 \sim \frac{1}{T_B^1}$$

$$f^3 \sim \frac{1}{T_B^2}$$

$$f^4 \sim \frac{1}{T_B^3}$$

$$f^5 \sim \frac{1}{T_B^4}$$

Figure 2:
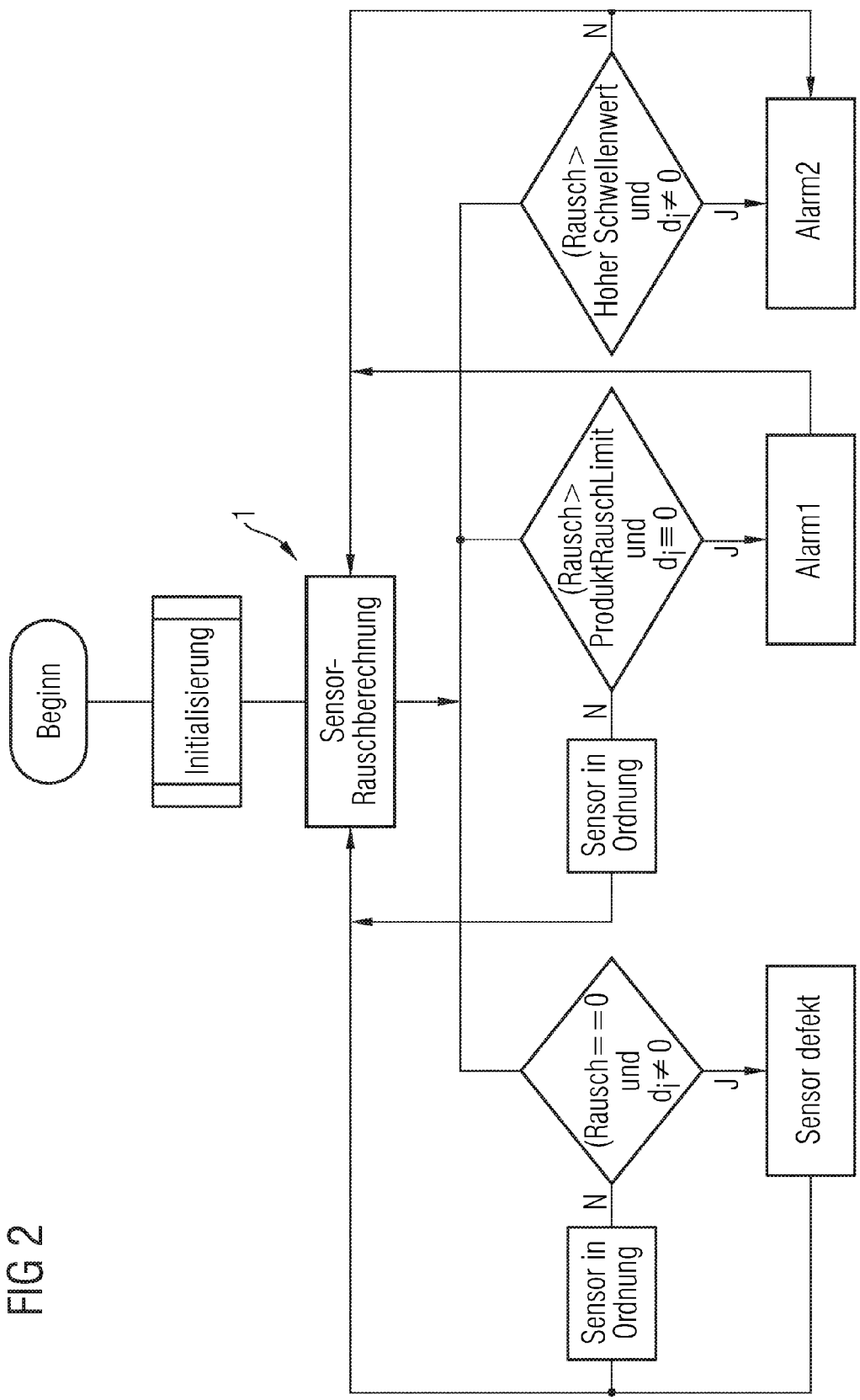
FIG. 2: shows a block diagram illustrating a monitoring algorithm of a sensor noise signal, taking the current vehicle speed into account in each instance.

Exemplary embodiments of the method described above are now described for a vehicle, with the aid of the Figures in the drawing: Monitoring of sensor noise can be realized by means of the above calculation of sensor-noise, and can be used for the general function monitoring of a sensor. The results are made more plausible by introducing two limits in the form of threshold values and this increase in plausibility itself contains general function monitoring of the sensor itself. FIG. 2 shows an exemplary block diagram of a concrete application of this method, illustrating a monitoring algorithm of a sensor-noise signal $d_1$, taking a given, current vehicle speed into account. Any sensor output signal that reflects road-contact that is as direct as is possible can be used here.

According to the method and/or device 1 described with reference to the drawings in FIG. 1, the sensor-noise signal is examined in accordance with the sampling. Different frequency ranges are to be distinguished in the applied sensor-noise signal; normal vehicle dynamics affect a range between 0 and 5 Hz. The aim of the method described below is to eliminate these frequencies through a suitable choice of window size $n_w$ and granularity M.

An increase in sensor noise beyond a given limiting value for product noise can, for example, be caused by ageing of the sensor element or through external interference such as electromagnetic interference (EMC). However, mechanical shock impulses or signal breaks also lead to such an increase, or to a reduction of this type. Alarm 1 provides information relating to sensor quality through general threshold-value comparison. Alarm 2 on the other hand, offers additional information relating to different driving or road conditions, whereby the focus is on the parameter $\omega_Z$.

For an analysis of contributions going beyond normal driving dynamics, the frequencies concerned lie in a frequency range beginning at approximately 5 Hz. An appropriate choice of an adjusted size $n_w$ of the sliding window and a level of convolution M can be set consonant with the sampling rate.

Abnormal sensor noise can be recognized by a comparison of the given convolution value with a result obtained with the set frequency for a normal, flat road surface.

Figure 3:
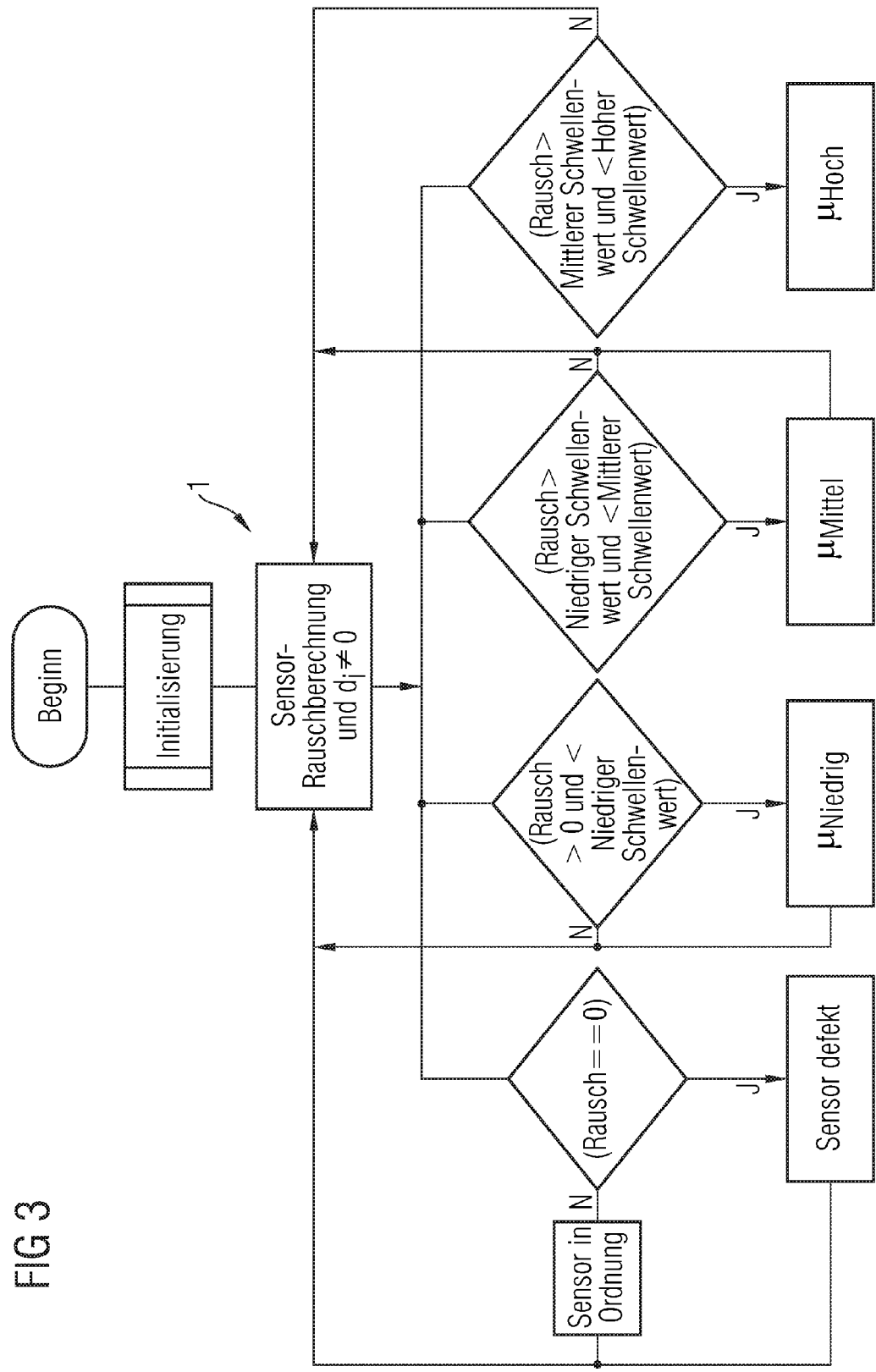
FIG. 3: shows a block diagram, similar to that of FIG. 2, for wheel friction analysis, with use of different output values of different indicative value, through gradation of limiting or threshold sensor noise values.
Figure 4:
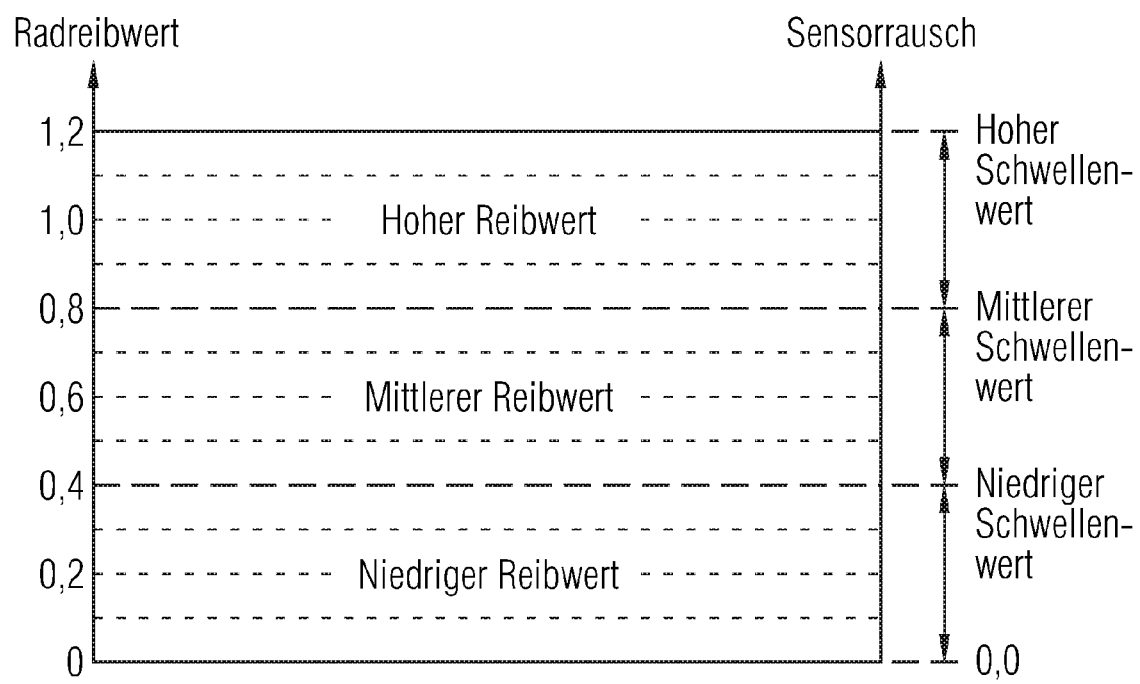
FIG. 4: shows a graphic comparison of wheel friction values and sensor-noise threshold values, as used as the basis of the design in accordance with FIG. 3.

As has been mentioned above, the quality of sensor noise can also be caused by specific road-surface conditions. Test measurements show a connection between the threshold values for sensor noise and varying road conditions. These further contain different values of friction between tires and the road surface. FIG. 3, like FIG. 2, is a block diagram showing analysis, by grading sensor-noise limit and/or threshold values, of friction, and use of different output values of differing indicative value. FIG. 4 shows a basic comparison, of wheel friction and sensor-noise threshold-values, forming the basis of the example of implementation of FIG. 3. This relationship between friction and the sensor-noise threshold value and analysis of it in accordance with the method described above are only one example of practical application in respect of the field of automotive engineering.

With the above evaluation according to FIG. 3, a frequency-selective decision is finally made, by means of comparisons of threshold values, as to in which interval a calculated sensor-noise value lies. With this, the decision for low, average or high friction can be made and transmitted to a motor management and/or driver assistance system.

The form of implementation in FIG. 3 therefore also lends itself to the possibility of estimating friction between tires and road surface, using the algorithm, insofar as the tire-pressure does not diverge greatly from the required value. Exact calculation of friction in terms of sliding friction is, by comparison, very expensive. It is, for example, based on complex modeling of tire behavior and highly exacting numerical methods.

A combination of the above-mentioned methods can give a sure estimate of wheel friction.

The convolutional method provides a rapid rough grading of friction. As a result, start or input parameters can be set for calculation on the basis of more expensive designs.

What is claimed is:

1. A method of monitoring noise in the output signal of a sensor, the method comprising:
    sampling a signal output of the sensor with a sampler;
    storing sample values in a buffer memory as the sample values are generated by the sampler;
    calculating an effect of spectral components of the sensor noise signal by using a first arithmetic element for calculating and evaluating sensor noise which uses a convolutional technique;
    wherein the first arithmetic element applies the convolutional technique more than once to calculate the effect of spectral components of the sensor noise signal, each application with a different granularity; and
    comparing the effect with reference values using a second arithmetic element.

2. The method according to claim 1, further comprising comparing the effect with reference values based at least in part on the basis of a standard deviation of an arithmetic mean.

3. The method according to claim 1, further comprising evaluating the sensor noise signal at a plurality of frequencies above frequencies expected during the course or normal driving dynamics of a motor vehicle.

4. The method according to claim 1, further comprising concluding the presence of a current friction value of a road surface from the results of the comparison of the effect with reference values.

5. The method according to claim 1, wherein the effects of spectral components of the sensor noise are determined at frequencies over 5 Hz.

6. A method of monitoring noise in the output signal of a sensor, comprising:
    sampling an electric output signal of a sensor,
    combining a plurality of sample values in groups of sample values,
    subjecting the sample values to a first averaging within each group,
    subjecting results of the first averaging to a second form of averaging, based at least in part on the average calculated for one or more adjacent or preceding and subsequent groups of sample values, and
    comparing the results of the second form of averaging to a set of reference values.

7. The method according to claim 6, further comprising using a convolutional technique to evaluate the results of the first and second averaging.

8. The method according to claim 7, wherein the convolutional technique is used with different granularities.

9. The method according to claim 6, further comprising calculating a standard deviation of an arithmetic mean across two or more of the groups of sample values.

10. The method according to claim 6, wherein sampling an electric output signal of a sensor includes sampling at frequencies above those generated by normal driving dynamics of a motor vehicle.

11. The method according to claim 6, wherein sampling an electric output signal of a sensor includes sampling at frequencies over 5 Hz.

12. The method according to claim 6, further comprising concluding the presence of a current friction value of a road surface based at least in part on comparison of the second averages with set threshold values.

13. A device for monitoring noise in the output signal of a sensor, the device comprising:
    a sampler connected to a signal output of a sensor, sampling noise in the output signal of the sensor;
    a first buffer memory storing of sample values, as the sample values are generated by the sampler;
    a first arithmetic element determining respective averages of groups of sample values, the arithmetic element operable to be adjusted with regard to the number of sample values or a window width to be processed;
    a second memory in communication with the arithmetic element;
    the second memory storing the respective averages determined by the first arithmetic element in the sequence in which they are determined; and
    a second arithmetic element calculating a second average across groups of sample values, taking one or more respective averages of adjacent or preceding and subsequent groups of sample values into account.

14. The device according to claim 13, further comprising a convolutional arithmetic element with an input for the setting of different levels of granularity.

15. The device according to claim 13, further comprising:
    an output, for transmitting at least one of a resulting value and a comparative assessment of results,
    a data ROM containing a reference value, and
    a comparison means For comparing the transmission of the output with the reference value.

* * * * *